(12) United States Patent
Quesnel et al.

(10) Patent No.: US 6,335,142 B1
(45) Date of Patent: *Jan. 1, 2002

(54) LIGHT ABSORBING COATING WITH HIGH ABSORPTION CAPACITY

(75) Inventors: Etienne Quesnel, Meylan; Patrick Chaton, Theys, both of (FR)

(73) Assignee: Commissariat a l'Energie Atomique, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,368

(22) Filed: Nov. 16, 1998

(30) Foreign Application Priority Data

Dec. 8, 1997 (FR) .............................. 97 15482

(51) Int. Cl.⁷ .................................................. G03C 1/77
(52) U.S. Cl. .............................. 430/275.1; 430/275.1; 430/495.1; 430/525; 430/271.1
(58) Field of Search .......................... 430/270.1, 275.1, 430/281.1, 276.1, 278.1, 320, 322, 495.1, 523, 524, 525, 935; 427/58, 96, 126.1, 160, 367, 404, 405

(56) References Cited

U.S. PATENT DOCUMENTS

| 4,300,143 A | * 11/1981 | Bell et al. ................... 430/945 |
| 4,590,118 A | * 5/1986 | Yatabe et al. ................ 428/215 |
| 4,960,310 A | * 10/1990 | Cushing ...................... 350/1.7 |
| 5,578,858 A | 11/1996 | Mueller et al. |
| 5,835,273 A | * 11/1998 | Ida et al. ..................... 359/584 |

FOREIGN PATENT DOCUMENTS

| EP | 0 716 334 | 6/1996 |
| GB | 2 240 204 | 7/1991 |
| WO | WO 94/09517 | 4/1994 |

OTHER PUBLICATIONS

D. P. Arndt, et al., Applied Optics, vol. 23, No. 20, pp. 3571–3596, "Multiple Determination Of The Optical Constants Of Thin–Film Coating Materials", Oct. 15, 1984.

Patent Abstracts of Japan, vol. 95, No. 7, JP 07 105574, Apr. 21, 1995.

Derwent Abstracts, AN 89–200592, EP 323 683 (EP 88–300048), Jul. 12, 1989.

Ronald E. Laird, et al., Proceedings of Optical Interference Coating Conference, pp. 364–366, "A Metal Oxide Approach For Production Of Selectable Absorption, Enhanced Contrast, Anti–Reflection Coatings For The Display Market" Jun. 1995.

Patent Abstracts of Japan, JP 54 133 134, Oct. 16, 1979.

Derwent Abstracts, AN 90–376181, FR 2–647259, Nov. 23, 1990.

E. D. Palik, Academic Press Handbook Series, "Handbook Of Optical Constants Of Solids", pp. 398–399, 1985.

W. P. Chen, et al., Journal Optical Society of America, vol. 71, No. 2, pp. 189–191, "Use Of Surface Plasma Waves For Determination Of The Thickness And Optical Constants Of Thin Matallic Films", Feb. 1981.#jf139##

Primary Examiner—Janet Baxter
Assistant Examiner—Yvette M. Clarke
(74) Attorney, Agent, or Firm—Oblon, Spivak, McClelland, Maier & Neustadt, P.C.

(57) ABSTRACT

Light absorbing coating with high absorption capacity.

This coating comprises at least one thin optically discontinuous metal layer (8), absorbent within a determined spectral range in the visible–near infrared range, and at least one dielectric layer (10) transparent within this range and formed on the thin layer. Application to imagery.

15 Claims, 3 Drawing Sheets

LIGHT ABSORBING COATING WITH HIGH ABSORPTION CAPACITY

TECHNICAL FIELD

This invention relates to a light absorbing coating.

It is a thin multi-layer coating, with an absorption function in the visible and/or near infrared spectral range.

The invention is particularly applicable to imagery, to limit parasite reflections and improve the separation between different detection channels, display screens and optical disks in which the function of the coating is to improve the contrast.

The invention is particularly applicable to:

optical systems designed for space applications, high precision imagery (telemetry), flat liquid crystal display or microtip display, and high definition television.

STATE OF PRIOR ART

One known method of making an absorbent coating (in the visible–near infrared range) consists of trapping a maximum amount of light that penetrates into the coating, and if possible to limit the amount of reflected light.

In most cases, parasite reflections are restricted by depositing an anti-reflection layer (AR) with a wide spectral range, on an absorbent layer.

The global structure thus defined may be made symmetric if necessary in order to limit light reflections from the substrate side or from the air side.

A distinction is made between three main categories of structures, depending on the required performances:

1) substrate/absorbent layer/air type structures,
2) substrate/absorbent layer/AR layer/air type structures, and
3) substrate/AR layer/absorbent layer/AR layer/air type structures.

A highly reflecting opaque metal layer may be deposited on the substrate beforehand, to limit optical transmission through these structures.

A very wide variety of techniques and materials are used to make absorbent layers, often called "black matrices".

The most frequent manufacturing method is to use a base layer (of polymer, resin or glass), into which absorbent pigments are added.

These absorbent pigments may for example be compounds based on iron oxide, cobalt aluminate or graphite.

The techniques used to deposit this type of composite absorbent layer very frequently include rolling.

However, there are other methods such as electrodeposition, vacuum deposition, or even anodic oxidation, calcination or laser annealing to improve surface absorption.

One known technique is to use absorbent layers made of black chromium obtained by electrodeposition making use of an electrolytic bath with a composition that is adjusted so that the color obtained is black.

This subject is described in document 1, which like other documents referenced later, is mentioned in the references at the end of this description.

We will consider vacuum deposition techniques in particular.

In this case, absorbent layers are generally inserted in an interference structure with thin stacked layers based on dielectric materials, particularly oxides.

There are then structures type 2) and type 3).

The antireflection function may be provided conventionally by multiple layers, with alternating high and low optical indexes n.

This is done for example using $TiO_2$ layers (n is approximately equal to 2.4) and $SiO_2$ layers (n is approximately equal to 1.5), or $MgF_2$ layers (n is approximately equal to 1.39).

The thickness of these layers is of the order of a few tenths of a micrometer, and the way in which they are stacked controls the spectral width and the central wave length of the band or antireflection function.

Several solutions have been proposed for the manufacture of the actual absorbent layers.

Absorbent layers frequently consist of oxides which are naturally absorbent or which are made absorbent by creating an oxygen deficiency at the time of deposition (sub-stoechiometric oxides).

For example, inherently absorbent compounds may include indium oxide, tungsten oxide, chromium oxide, tin oxide (see document 2), or even vanadium oxide.

Among these various compounds, note in particular that $CrO_2$, $In_2O$ and $SnO$ oxides are black.

Concerning sub-stoechiometric oxides, most compounds that are transparent in their stable form, may become absorbent if an oxygen depletion is created in them.

For example, this is the case for $NiO_x$ nickel oxides recommended in document 3, which are inserted in a double $TiO_2/SiO_2/NiO_x/TiO_2/SiO_2$ type of anti-reflection structure.

Note also the structure proposed in document 4, which is composed of a multiple layer stack consisting of Cr/absorbent dielectric/AR layer.

The absorbent layer is then preferably composed of manganese oxide, or chromium or iron oxide, or possibly silica containing dispersed chromium.

Other materials such as nitrides (TiN and ZrN mentioned in document 3) may also form useful absorbent layers.

In particular, it is well known that titanium nitride layers $TiN_x$ offer a wide range of green-bronze to golden yellow colors, depending on the value of x.

Note also the use of more exotic absorbent materials such as the SiGe compound (see document 5).

Note also the absorbent stack $Cr/Cr_2O_3/Cr/Cr_2O_3$ that is used to improve the contrast of liquid crystal screens (see document 6), and which includes layers with a thickness varying from 10 nm to a few tens of nanometers.

Light is generally absorbed using more or less absorbent materials, in which the extinguishing coefficient k normally remains less than or equal to about $10^{-1}$ in the visible–near infrared range (k being of the order of $10^{-4}$ to $10^{-5}$ for a transparent dielectric).

In this case, if it is required to make a layer with quasi-total absorption, a layer must be used with a thickness equal to at least 1 $\mu$m, and it must be provided with anti-reflection layers to limit reflections at the air/layer interface.

A better way of maximizing absorption is to use an absorbent structure formed of N layers of Cr alternating with N layers of $Cr_2O_3$, given the high extinguishing coefficient k of chromium (k is equal to 4 in the visible range).

Absorption of at least 95% of the incident light in the visible range then requires that several $Cr/Cr_2O_3$ pairs are stacked (N>2), hence the total thickness of chromium and chromium oxide is at least 100 nm to 200 nm.

The thickness of this structure must increase as the required absorption gets closer to 100%.

The performance is then limited due to mechanical strength problems.

It is well known that thin layers of chromium are some of the most highly stressed metals, which typically limits its thickness to 200 nm (see document 7).

Above this thickness the layer crazes and separates.

Therefore, guaranteeing mechanical stability of the absorber requires that the thinnest possible multilayer structure should be used, and using materials with low stresses.

DESCRIPTION OF THE INVENTION

The purpose of this invention is to design a multilayer coating with a high absorption capacity (absorption of more than 95% of light) in the visible near infrared range, while minimizing risks of mechanical instability related to stresses in the layers in this absorbent coating.

The invention achieves this using an absorbent multilayer structure that includes at least one thin metal layer as an absorption element, with the specific feature that it is optically discontinuous.

In particular, as we will see in the examples given later, this restricts the total thickness of the absorber to less than 200 nm, while providing absorption of between 97% and 99% within the visible–near infrared range.

Specifically, the purpose of the invention is a light absorbing coating in a given spectral range within the visible–near infrared range, this coating being formed on a substrate and characterized in that it comprises:

at least one layer of thin metal which is absorbent in this determined spectral range, and
 at least one dielectric layer which is transparent in this determined spectral range, this dielectric layer being formed on this thin metal layer, and in that this thin metal layer is optically discontinuous, its refraction index being greater than the refraction index of the metal in the bulk state, and its extinguishing coefficient being less than the extinguishing coefficient of the metal in the bulk state, within the determined spectral range.

"Metal in the bulk state" means a very thick layer of this metal with a thickness of at least 1 $\mu$m.

According to one specific embodiment of the coating according to the invention, in order to increase the absorption of this coating, this coating comprises at least two thin, optically discontinuous metal layers, the dielectric layer being formed on the thin metal layer furthest from the substrate.

The coating according to the invention may also comprise a thick, optically continuous metal layer between the substrate and the thin metal layer closest to this substrate.

Within this spectral range concerned, the refraction index of this thick layer is then approximately equal to the refraction index of the corresponding metal in the bulk state, and the extinguishing coefficient of this thick layer is approximately equal to the extinguishing coefficient of the corresponding metal in the bulk state.

The function of this optically continuous metal layer formed on the substrate is to prevent light transmission and to reflect light towards the absorbent layer(s).

When this optically continuous metal layer is made of aluminum, a transmission coefficient of less than $10^{-3}$ in the visible range is obtained when the aluminum thickness is not less than 50 nm.

A coating according to the invention can be made which is "symmetric", so that it performs the same optical function on the substrate side and on the air side; a coating according to the invention may comprise, in sequence starting from the substrate, a first dielectric layer, a first optically discontinuous thin metal layer, a second dielectric layer, an optically continuous thick metal layer, a second optically discontinuous thin metal layer, and a third dielectric layer.

The optically continuous thick metal layer is preferably a metal M having a property that its oxide $M_xO_y$ which is transparent within the determined spectral range.

This metal in the optically continuous thick metal layer may be chosen from the group including titanium, hafnium, chromium and niobium but aluminum will be used in preference, since it has a high extinguishing coefficient k (of the order of 5 to 8 in the visible range).

In a coating according to the invention, each dielectric layer may be chosen from oxide layers that are dielectric and transparent in the determined spectral range.

However, compounds other than these oxides may be used, if necessary for the application.

For example, it would be possible to use dielectric fluorides that are transparent within the determined spectral range.

According to one embodiment of the invention, preferred for its performances, each optically discontinuous thin layer is an aluminum layer with a thickness less than or approximately equal to 15 nm, the coating also comprising an alumina layer on which this thin, optically discontinuous layer is formed.

Note that the choice of the stack to be made to obtain a coating according to the invention depends on the spectral band width at which maximum absorption is required.

This choice also depends on the residual reflection level tolerated in the application considered.

Therefore one of the features of this invention is that the optical performances of the coating are adjustable depending on the specific requirements.

In the case of the preferred embodiment mentioned above, a coating according to the invention of the following type can be made:

substrate/optically continuous metal layer/alumina layer/optically discontinuous aluminum layer/dielectric layer.

A coating of the following type can also be made according to the invention to increase optical absorption:

substrate/optically continuous metal layer/alumina layer/optically discontinuous aluminum layer/ . . . /alumina layer/optically discontinuous aluminum layer/dielectric layer in which the "alumina layer/optically discontinuous aluminum layer" pattern is repeated at least twice.

A coating according to the invention with a "symmetric" type structure of the following type can also be made:

substrate/dielectric layer/alumina layer/optically discontinuous aluminum layer/dielectric layer/optically continuous metal layer/alumina layer/optically discontinuous aluminum layer/dielectric layer.

Coatings conform with the invention will preferably be made by vacuum deposition of the layers.

Typical thicknesses of these layers are a few nanometers for an optically discontinuous aluminum layer and a few tens or a few hundreds of nanometers for each dielectric layer such as $Al_2O_3$ and for each optically continuous metal layer.

A slow and stable deposition technique must be used to control the small thicknesses of metal.

The ionic atomization (cathodic or by ion beam) method is particularly well adapted to the invention.

The advantage of using a homogeneous "alumina layer/optically discontinuous aluminum layer" type of absorbent structure is that the changeover from the metal layer to the oxide layer can be made simply be adding oxygen into the containment in which the coating is being formed.

In this case, the layer deposition device is particularly simple, since all it comprises is one metallic atomization target placed in a vacuum containment in which atomization is done successively in a rare gas atmosphere and in a mix of rare gases and oxygen.

One of the innovative features of this invention lies in the use of one or several thin, optically discontinuous metal layers, in which the optical constants n and k are very different from those of bulk metal, or from those of a thick layer of this metal (which are not very different from the values for the bulk metal).

Document 8 contains information about the optical constants for a thick layer of aluminum.

The use of at least one thin optically discontinuous metal layer induces high absorption which is significantly higher than if an optically continuous metal layer is used.

Another advantage of a coating according to the invention is that it is thin.

The preferred use of aluminum and alumina also restricts mechanical stresses in the layers of the coating.

Consequently, a perfectly bonding structure is obtained, to which subsequent treatment can be applied without damage.

For example, it is possible to perform ionic etching or "lift-off" type etching of openings in the coating and thus identify the boundaries of local diaphragms.

Heat treatments can also be applied at temperatures up to the order of 300° C. to 400° C. without significantly modifying the absorption function, the alumina acting as a diffusion barrier.

Another advantage resulting from the low thickness of a coating according to the invention is the limitation of surface diffusion that is typically less than 1% in the visible range.

This is important when the objective is to limit parasite light in optical systems.

BRIEF DESCRIPTION OF THE FIGURES

This invention will be better understood after reading the description of the example embodiments given below for informative purposes only, and in no way restrictive, with reference to the attached drawings in which.

DETAILED DESCRIPTION OF PARTICULAR EMBODIMENTS

Considering the preferred example of a thin optically discontinuous aluminum layer, the discontinuity of this layer results in a refraction index n very much higher than the refraction index of bulk aluminum, at a given wave length.

Figure 1:
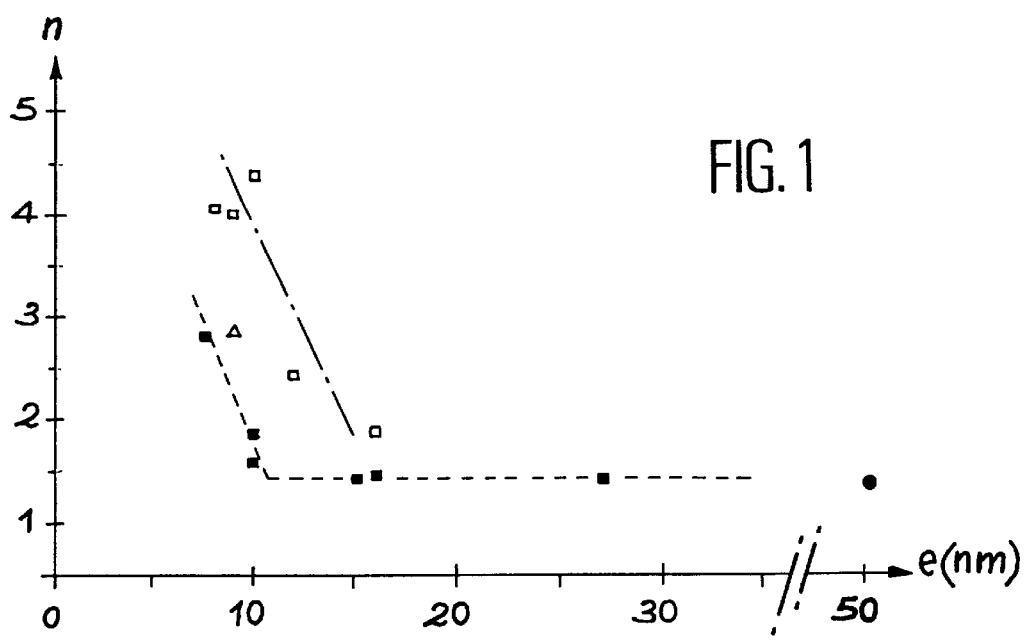
FIG. 1 shows the values of the refraction index as a function of the thickness for a given wave length, for an optically discontinuous metal layer and for an optically continuous layer of the same metal.

FIG. 1 shows variations in the refraction index n of an aluminum layer, as a function of the thickness e of this layer for wave length 632.8 nm.

The black squares are applicable to an aluminum layer on a glass substrate type BK7 and the white squares are applicable to an aluminum layer on an alumina layer, itself formed on a glass substrate type BK7.

The black circle is applicable to the refraction index of a thick layer of opaque aluminum, with thickness e>50 nm (see document 8).

It can be seen that the optical discontinuity appears for a given thickness that may vary with the nature of the substrate or the layer on which the optically discontinuous layer is formed.

If aluminum is deposited on glass, the aluminum layer is optically continuous if its thickness exceeds 10 nm.

If aluminum is deposited on an alumina layer, itself deposited on a glass layer, the aluminum layer becomes optically discontinuous at less than 15 nm.

In other words, formation of an aluminum layer on an alumina layer improves optical discontinuity of the aluminum layer.

In FIG. 1, the white triangle is applicable to an aluminum layer formed on a $TiO_2$ layer, itself formed on a glass substrate type BK7.

It can be seen that the corresponding refraction index is very similar to the index for an aluminum layer of the same thickness formed on the glass.

To obtain a highly absorbent coating conform with the invention with an aluminum layer deposited on a layer of an oxide such as $SiO_2$, $TiO_2$, $AlO_2$ or $Cr_2O_3$, the thickness of this aluminum layer must not exceed 10 nm.

Figure 2:
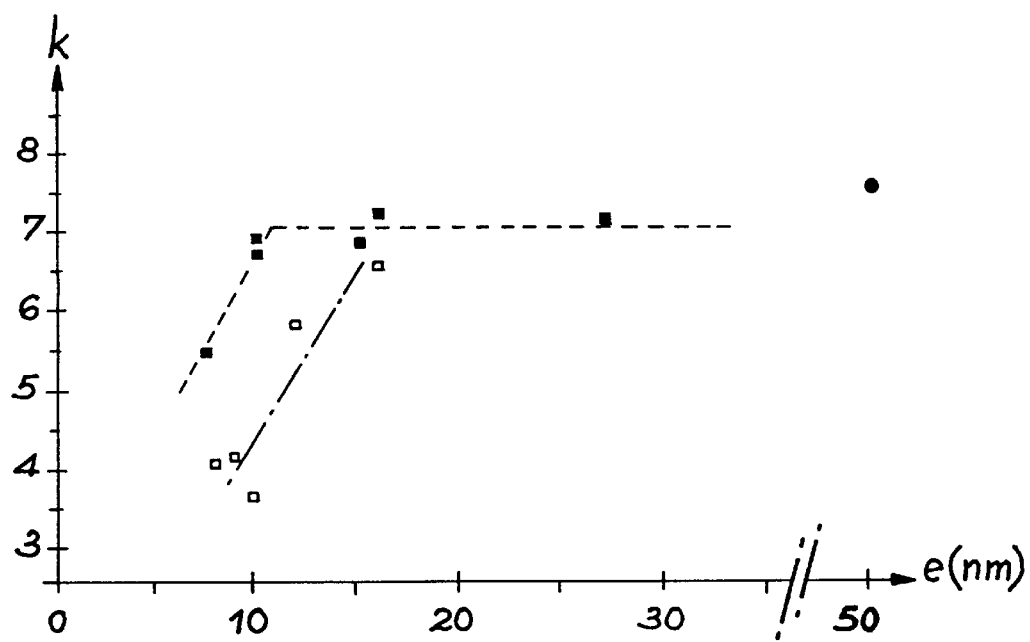
FIG. 2 shows values of the extinguishing coefficient as a function of the thickness for a given wave length, for an optically continuous metal layer and for an optically continuous layer of the same metal.

FIG. 2 shows variations in the extinguishing coefficient k as a function of the thickness e for an aluminum layer, at wave length 632.8 nm.

The black squares are applicable to a layer of aluminum on a glass substrate type BK7, and the white squares are applicable to an aluminum layer on an alumina layer, itself formed on a glass substrate type BK7.

The black circle shows the extinguishing coefficient for a thick layer of opaque aluminum, with thickness e<50 nm (see document 8).

Note the sudden drop in the extinguishing coefficient of the aluminum layer when it becomes optically discontinuous.

This coefficient k then becomes very much less than the value for bulk aluminum.

Note that measurements of n and k were made using the surface plasmon technique, which is described in detail in document 9.

Figure 3:
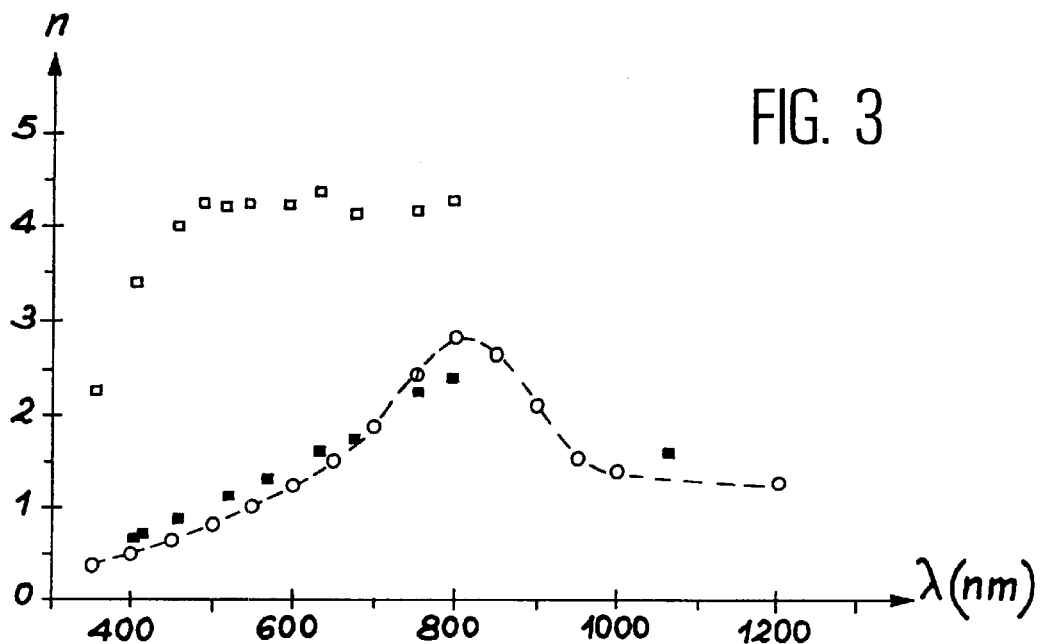
FIG. 3 shows values of the refraction index as a function of the wave length, for given metal thicknesses.

FIG. 3 shows variations of the refraction index n of aluminum layers as a function of the wave length $\lambda$ within the spectral range varying from 300 nm to 1 300 nm.

White circles are applicable to an aluminum layer with a thickness greater than 50 nm (the corresponding values are given in document 8), the black squares are applicable to a 10 nm thick aluminum layer formed on a glass substrate type BK7, and the white squares are applicable to a 10 nm thick aluminum layer formed on a 100 nm thick alumina layer, itself formed on a glass substrate type BK7.

Figure 4:
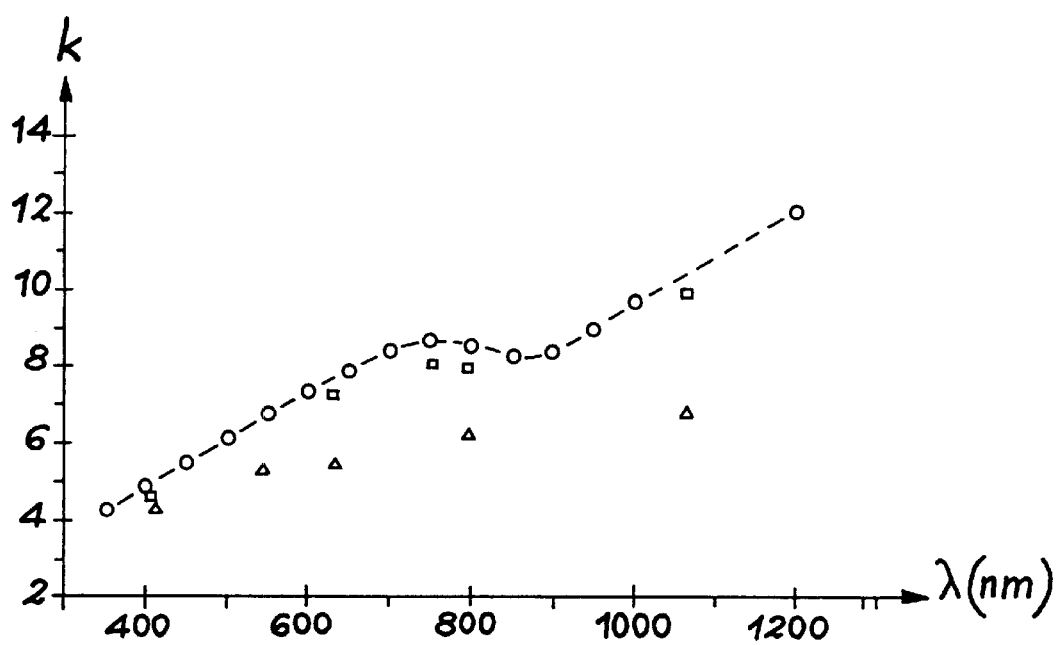
FIG. 4 represents values of the extinguishing coefficient as a function of the wave length, for given metal thicknesses.

FIG. 4 shows variations of the extinguishing coefficient k for aluminum layers deposited on a glass layer type BK7 as a function of the wave length $\lambda$, in the same spectral range (300 nm to 1 300 nm).

The white circles are applicable to an aluminum layer with thickness e>50 nm (document 8), the white squares are applicable for a 27 nm thick aluminum layer and the white triangles are applicable for a 7.5 nm thick aluminum layer that appears optically discontinuous.

The large difference between the refraction index and the extinguishing coefficient compared with bulk aluminum (or a thick layer of aluminum) is consistent over the entire spectral range considered.

Figure 5:
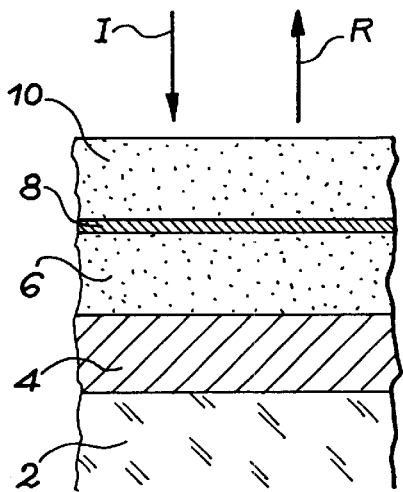
FIGS. 5 to 8 are diagrammatic and partial cross-sectional views of absorbent coatings according to the invention.

FIG. 5 is a partial and diagrammatic cross-sectional view of a coating according to the invention.

The coating in FIG. 5 comprises a sequence consisting of a thick metal layer 4 of the order of several tens of nanometers thick, an alumina layer 6 of the order of a few tens of nanometers thick, a thin, absorbent, optically discontinuous aluminum layer 8 with a thickness less than or equal to 15 nm and a dielectric layer 10, on a substrate 2.

In this example, light I penetrates into the coating through the dielectric layer 10.

Due to absorption in the coating, the quantity of reflected light R is very low.

The spectral response of the absorbent coating can be adjusted by choosing the thicknesses of the dielectric layer 10 and the alumina layer.

For example, a coating can be made conform with the coating shown in FIG. 5, perfectly opaque and anti-reflecting within the spectral range from 450 nm to 950 nm, on a type BK7 glass substrate 2, and an aluminum layer 4 and an alumina layer 10 are chosen, and the thickness of layers 4, 6, 8 and 10 are 50 nm, 64 nm, 8 nm and 70 nm respectively.

This results in a coating with an optical absorption in this spectral range equal to or greater than 98%, and with a reflection coefficient of less than or equal to 2%.

The optical absorption of a coating identical to this coating, except that the 8 nm thick layer 8 is assumed to have the optical constants of bulk aluminum, was calculated in order to demonstrate the advantage of this type of coating.

Under these conditions, it was found that the optical discontinuity of layer 8 can increase the optical absorption by an average of 55%.

The integrated optical diffusion of the coating according to the invention in FIG. 5 was measured, and the value found was 0.97% at wave length 633 nm.

By comparison, a black absorbent paint diffuses light at a typical level of 5%.

Figure 6:
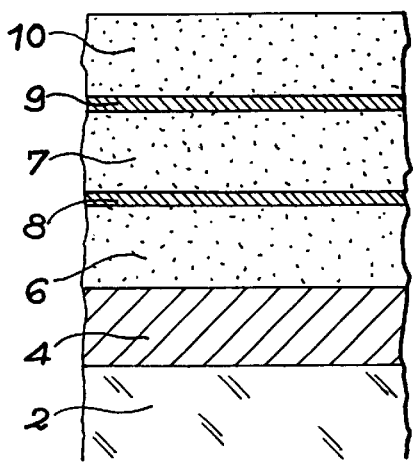

Another more absorbent coating according to the invention is shown diagrammatically in FIG. 6, and the only difference between this coating and the coating shown in FIG. 5 is that between layer 8 and layer 10, there is also another alumina layer 7 for example 64 nm thick and formed on layer 8, and another thin layer of optically discontinuous aluminum 9 for example 8 nm thick and formed on layer 7, layer 10 then being formed on layer 9.

The aluminum layer 4 may be replaced by an opaque layer of chromium, for example 70 nm thick.

Under these conditions, the optical absorption of the structure in FIG. 5 may for example be at least equal to 98.7% over the entire spectral range between 450 nm and 950 nm, and it is also found that the reflection response of the coating is not particularly sensitive to the angle of incidence, provided that it remains less than 40°.

Some applications require that metallic baffles are treated to limit parasite reflections.

These baffles, which may for example be made of stainless steel or aluminum, may be efficiently treated by a coating according to the invention.

Figure 7:
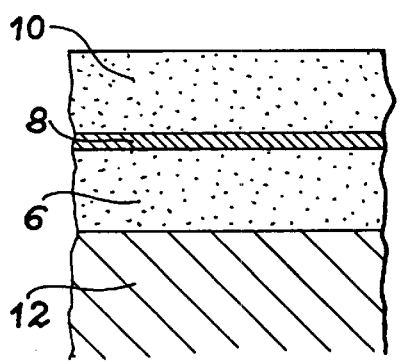

This coating is diagrammatically illustrated in the cross-section in FIG. 7, in which this type of baffle is shown as reference 12.

The stack of three layers 6, 8, 10 mentioned in the description of FIG. 5, are formed on this baffle 12.

With the thicknesses mentioned above for this stack, an extremely thin layer with a thickness of 142 nm is obtained, which limits optical losses by diffusion and gives a very adherent treatment of a plate of a metallic baffle, which is not the case for thick black paint type treatments.

Figure 8:
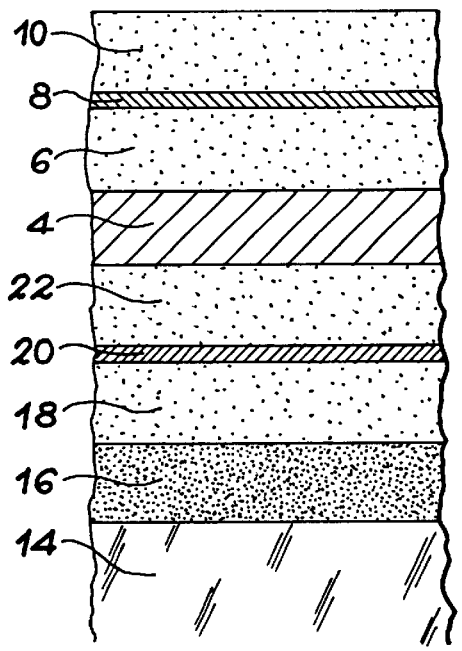

Another coating according to the invention is shown diagrammatically in cross-section in FIG. 8.

This coating in FIG. 8 is formed on a sapphire substrate 14 and, starting from this substrate 14, comprises in sequence a $TiO_2$ layer 16, an alumina layer 18, a thin, optically discontinuous aluminum layer 20, an alumina layer 22, and then the aluminum layer 4, the alumina layer 6, the optically discontinuous aluminum layer 8 and the alumina layer 10 described in FIG. 5.

In the example in FIG. 8, the thicknesses of layers 16, 18, 20, 22, 4, 6, 8 and 10 are equal to 26 nm, 20 nm, 8 nm, 83 nm, 50 nm, 64 nm, 8 nm and 70 nm respectively.

The second part of this absorber shown in FIG. 8 (layers 4 to 10 on the air side) is identical to the absorber in the example in FIG. 5, and therefore the optical response on the air side is the same.

On the sapphire side, the reflection coefficient in the sapphire does not exceed 3.5% between 450 nm and 950 nm.

The thickness of the absorber in FIG. 8 is low and is equal to 338 nm and this double absorber may be engraved, due to this low thickness and the limited mechanical stresses in the materials used.

This invention can result in:

very thin multi-layer coatings (thicknesses less than 0.25 $\mu$m), which are still very absorbent, completely opaque coatings (with absorption losses exceeding 95%) over a very wide spectral range varying from the visible range to the near infrared range, particularly the 450 nm–950 nm spectral range, and its optical performances are not very sensitive to the angle of incidence, absorbent coatings for which optical performances and the width of the spectral range may be adjusted by modifying how their layers are stacked, very absorbent coatings which remain slightly diffusing (diffusion coefficient less than 1% in the visible range), and very absorbent coatings that may be engraved by a plasma or the "lift-off" technique due to the use of slightly stressed metallic and dielectric materials such as aluminum and alumina.

The following documents are mentioned in this description:

1. European patent application No. 88300048, COUNCIL SCIE IND RES (1989).
2. JP 54133134, CANON KK (1979).
3. R. E. Laird, J. D. Wolfe and C. K. Carniglia, Proceedings of Optical Interference Coatings Conference, Tucson, June 1995, p. 364.
4. FR 2647259, THOMSON TUBES ELTRN (1989).
5. GB 2240204, SAMSUNG ELECTRONICS CO (1991).
6. EP 0716334A, AT&T CORP. (1996).
7. H. K. Pulker, "Coatings on glass", Thin Films Science and Technology, ELSEVIER (1984).

8. E. D. PALIK, Handbook of Optical Constants of Solids, Academic Press (1985).

9. W. P. Chen and J. M. Chen: "Use of surface plasma waves for determination of the thickness and optical constants of thin metallic films", Opt. Soc. Of America, vol. 71, No. 2, February 1981.

What is claimed is:

1. Coating absorbing light within a spectral range within the visible–near infrared range, said coating being formed on a substrate (2, 12, 14) and characterized in that it comprises:

at least one layer of thin metal (8, 9, 20) which is absorbent in said spectral range, and at least one dielectric layer (7, 10, 22) which is transparent in said spectral range, said dielectric layer being formed on said thin metal layer, and in that said thin metal layer is optically discontinuous, its refraction index being greater than the refraction index of the metal in the bulk state, and its extinguishing coefficient being less than the extinguishing coefficient of the metal in the bulk state, within said spectral range, said coating also comprising a thick, optically continuous metal layer (4) between the substrate (2) and the thin metal layer (8) closest to this substrate.

2. Coating according to claim 1, comprising at least two thin, optically discontinuous metal layers (8, 9), the dielectric layer (10) being formed on the thin metal layer that is furthest from the substrate (2).

3. Coating according to claim 2, in which the metal in the thick optically continuous, metal layer (4) is a metal having a property that its oxide is transparent within the determined spectral range.

4. Coating according to claim 3, in which the metal in the thick optically continuous metal layer (4) is selected from the group consisting of titanium, hafnium, chromium, niobium and aluminum.

5. Coating according to claim 1, in which the metal in the thick optically continuous metal layer (4) is a metal having a property that its oxide is transparent within the determined spectral range.

6. Coating according to claim 5, in which the metal in the thick, optically continuous metal layer (4) is selected from the group consisting of titanium, hafnium, chromium, niobium and aluminum.

7. Coating according to claim 1, in which each dielectric layer (10, 16, 22) is chosen among oxide and fluoride layers that are dielectric and transparent within said spectral range.

8. Coating according to claim 1, in which each thin, optically discontinuous layer is an aluminum layer (8, 9, 20) with a thickness approximately equal to or less than 15 nm, the coating also comprising an alumina layer (6, 7, 18) on which this thin, optically discontinuous layer is formed.

9. Coating absorbing light within a spectral range within the visible–near infrared range, said coating being formed on a substrate and characterized in that it comprises, in sequence, starting from a substrate (14), a first dielectric layer (16), a first thin, optically discontinuous metal layer (20), a second dielectric layer (22), a thick, optically continuous metal layer (4), a second thin, optically discontinuous metal layer (8), and a third dielectric layer (10), said layer of thin metal being absorbent in said spectral range, said dielectric layers being transparent in said spectral range, said thin metal layers being optically discontinuous, their refraction index being greater than the refraction index of the metal in the bulk state, and their extinguishing coefficient being less than the extinguishing coefficient of the metal in the bulk state, within said spectral range.

10. Coating according to claim 9, comprising at least two thin, optically discontinuous metal layers (8, 9), the dielectric layer (10) being formed on the thin metal layer that is furthest from the substrate (2).

11. Coating according to claim 10, in which the metal in the thick optically continuous metal layer (4) is a metal having a property that its oxide is transparent within the determined spectral range.

12. Coating according to claim 11, in which the metal in the thick optically continuous metal layer (4) is a metal having a property that its oxide is transparent within the determined spectral range.

13. Coating according to claim 9, in which each dielectric layer (10, 16, 22) is chosen among oxide and fluoride layers that are dielectric and transparent within the spectral range considered.

14. Coating according to claim 9, in which each thin, optically discontinuous layer is an aluminum layer (8, 9, 20) with a thickness approximately equal to or less than 15 nm, the coating also comprising an alumina layer (6, 7, 18) on which this thin, optically discontinuous layer is formed.

15. Coating according to claim 11, in which the metal in the thick optically continuous metal layer (4) is chosen from the group comprising titanium, hafnium, chromium, niobium and aluminum.

* * * * *